Patented Oct. 4, 1949

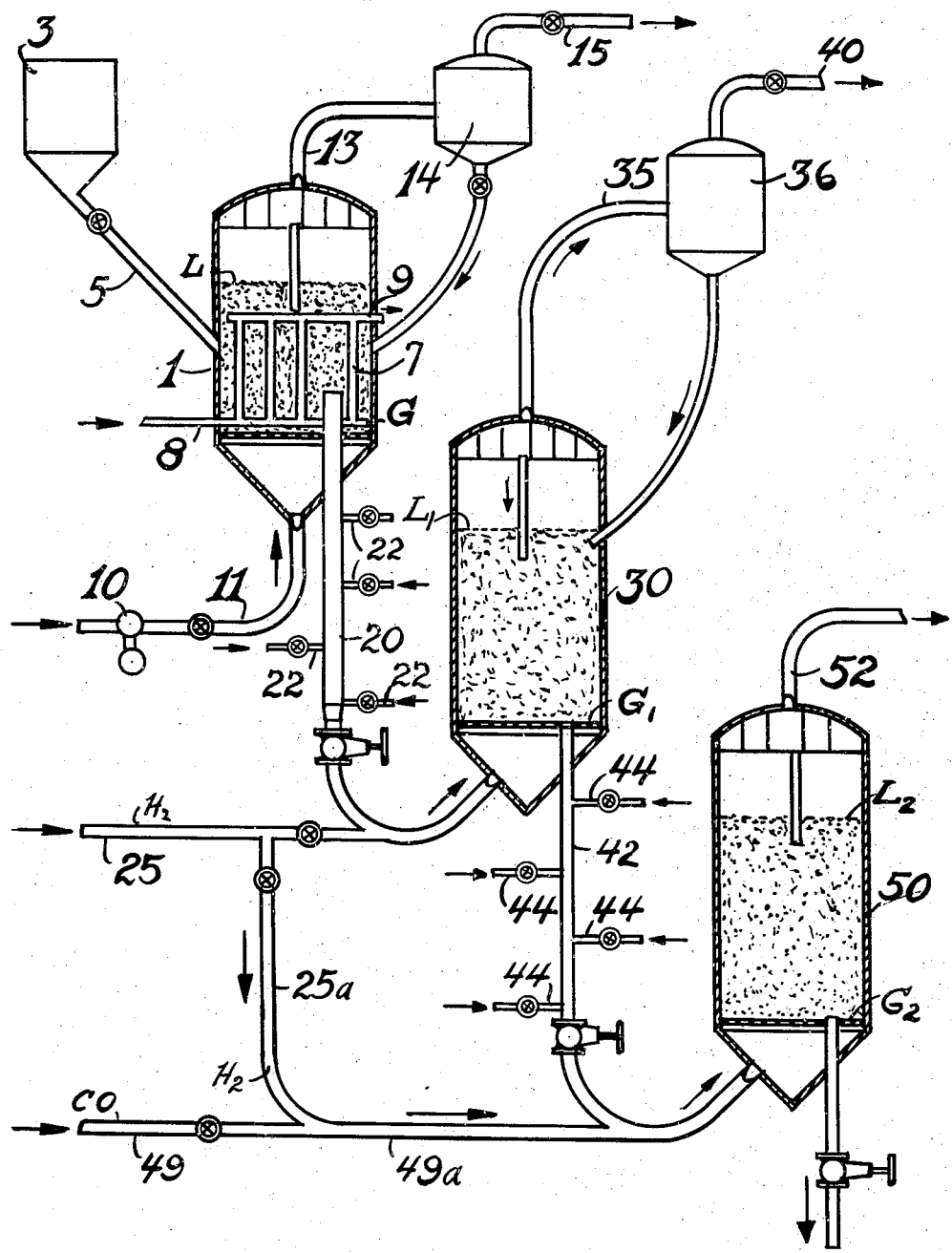

2,483,512

UNITED STATES PATENT OFFICE 2,483,512

HYDROCARBON SYNTHESIS PROCESS CATALYZED BY OXIDIZED AND REDUCED IRON

Alexis Voorhies, Jr., and John J. Owen, Baton Rouge, La., assignors to Standard Oil Development Company, a corporation of Delaware Application January 26, 1946, Serial No. 643,796

3 Claims. (Cl. 260—449.6)

Our present invention relates to improvements in the manufacture of catalyst utilizable in the hydrocarbon synthesis reaction; that is to say, the chemical reaction in which carbon monoxide and hydrogen are reacted to form hydrocarbons, including hydrocarbons boiling within the gasoline and gas oil boiling range. More particularly our invention relates to improvements in the preparation of iron catalyst according to various methods which will be set forth more fully hereinafter.

As indicated previously, it was known prior to our invention that hydrocarbons could be synthesized by reacting carbon monoxide and hydrogen at elevated temperatures in the presence of a suitable catalyst. Heretofore, the catalyst employed has generally been one selected from the VIII Group of the Periodic System, and it is undoubtedly true that the metals cobalt and iron have been used more than any other catalysts in this particular synthesis. It should also be pointed out that the cobalt catalyst is usually associated with a suitable promoter, such as thoria, and it is usually supported on a suitable spacing agent such as kieselguhr. With respect to the iron catalysts, they have heretofore been prepared in several ways. For example they have been prepared by reducing a native ore such as hematite to the metallic state with hydrogen, or some other reducing gas; or the iron catalysts for this synthesis have been prepared by oxidizing metallic iron and thereafter reducing the same. Still another method for preparing iron catalysts involves precipitating iron hydroxide from an aqueous solution of a water-soluble iron salt by adding thereto an alkali metal hydroxide or ammonium hydroxide, filtering the iron hydroxide precipitate, drying, igniting and thereafter reducing the hydroxide with hydrogen or some other reducing gas. A promoter such as a salt of an alkali metal is generally added at some stage during the preparation. One drawback to those processes in which iron is oxidized and thereafter reduced is that heretofore high temperatures in the range of from about 1000° to 1800° F. have been employed where the iron was oxidized by means of air or oxygen and reduction with hydrogen was also carried out at high temperatures, for example, in the range of about 1000 to 1500° F. In this type of high temperature oxidation, followed by an equally high temperature of reduction, it is impossible to control the oxidation temperature within narrow limits when the operation is performed in fixed or stationary beds.

We have now discovered that when the oxidation is controlled by maintaining the metal in the "fluidized" condition while it is being contacted with air at 600 to 900° F., an active catalyst can be prepared when the subsequent reduction is also carried out in the same temperature range. An important characteristic of catalysts so prepared is that they give synthesis products unusually rich in oxygenated compounds, such as alcohols and ketones. Insofar as we are aware, this method of preparing hydrocarbon synthesis catalysts by a combination of low temperature oxidation of metals (e. g. iron) followed by low temperature reduction has not been previously described in the literature and is not now performed in practice. The control of oxidation temperatures within the narrow temperature range indicated has been made possible by utilization of the "fluid" processes, wherein the finely divided metal particles are constantly agitated by the oxidizing gas. A suitable promoter for the hydrocarbon synthesis reaction can be added to the iron before or after the oxidation step, hereinbefore mentioned.

The object of our invention, therefore, is to prepare a catalyst which is adapted to promote the synthesis of hydrocarbons by successive oxidation and reduction of the catalytic metallic substance performed at temperatures substantially lower than those heretofore employed for the same purpose.

Another object of our present invention is to prepare a catalyst utilizable in the hydrocarbon synthesis process in a more expeditious and in a cheaper manner.

A still further object of our present invention is to prepare an active catalyst utilizable in the hydrocarbon synthesis reaction, which preparation involves the oxidation of the metal followed by reduction under conditions such that not only is the temperature during the oxidation phase controlled within rather narrow temperature limits, but the degree of oxidation is likewise maintained within desired limits.

A further object of our invention is to prepare a hydrocarbon synthesis catalyst especially adapted to promote the production of increased quantities of oxygenated compounds, such as alcohols and ketones in the hydrocarbon synthesis reaction.

Other and further objects of our invention will appear from the following more detailed description and claims.

In the accompanying drawing, we have shown diagrammatically an apparatus layout in which a preferred modification of our invention may be carried into practical effect.

We have found that the preferred method for preparing a catalyst such as an iron catalyst which is to be employed in the hydrocarbon synthesis is to start with an iron powder and to oxidize the same with air while it is in the form of a dense suspension in the oxidation zone and thereafter to withdraw the metal from the oxidation zone and reduce it in the reduction zone while it is also maintained in the form of a dense suspension, all of which will appear more fully presently.

Referring in detail to the drawing, 1 represents an oxidation vessel consisting essentially of a vertical cylindrical section, a concave crownpiece and a conical base portion. The oxidation vessel is provided with a reticulated member G disposed in the lower part of the cylindrical portion. Iron powder having a particle size of from about 5 to 300 microns average diameter and preferably having less than 50% by weight of the particles with a diameter greater than 80 microns is impregnated with a suitable promoter such as 0.5 to 1% of an alkali metal carbonate. The impregnated iron powder is continuously withdrawn from a supply hopper 3 via line 5 and discharged into the oxidation vessel 1. Simultaneously, compressed air from some external source (not shown) is pumped by compressor 10 through line 11 into the bottom of oxidizing vessel 1 and is thereafter forced upwardly into the main portion of the oxidizer 1. The superficial velocity of the air is maintained within the range of say 0.3 to 3.0 feet per second so as to form within the vessel 1 a dense, turbulent, ebullient suspension having an upper dense phase level, depending upon the actual number of pounds of iron charged to the reactor, at some point which we have represented at L. The density of this suspension will be of the order of 50 to 175 lbs. per cu. ft. or from 30 to 95% of the density of the unaerated powder. Above L in reactor 1, there is a more dilute phase, the concentration of iron in the gas decreasing rather sharply from the level L to the top of the reactor. There is disposed in the upper portion of the reactor a plurality of solids gas-contacting devices, commonly called "cyclone separators," through which the up-flowing suspension is forced and wherein the entrained powder is separated by centrifugal operation, according to known procedure, whereupon the spent gas finally separated from the main portion of the iron is withdrawn from the upper portion of the oxidizer through pipe 13. Since extremely finely divided iron may be contained in the gas in line 13, it is usually preferable to force the gas through one or more electrical or magnetic precipitating devices 14 which serve to remove substantially the last trace of powder from the gas, which powder is then returned to the oxidizer by a dip pipe and the gases are rejected from the system through line 15. Now, with respect to conditions within the oxidizer 1, it is pointed out, as heretofore indicated, that the temperature is maintained within the range of from about 600 to 900° F., and that the pressure within the reactor is from 0 to 300 lbs. per sq. in. gauge pressure and the residence time of the iron in the oxidizing zone is such that the iron is only incompletely oxidized. In order to control temperature within the oxidizer 1 it is necessary or at least desirable to dispose within the oxidizer 1 means for cooling the oxidizing zone. Thus, in the drawing we have shown tubes 7 into which may be fed a fluid cooling medium from some external source via line 8 and withdrawn from the cooling tubes via a pipe 9. The cooling medium thus circulating in the cooling coils may be water, hydrocarbon oils, etc.

The partially oxidized iron is continuously withdrawn from the oxidizing zone by means of a drawoff pipe 20. It will be understood by those familiar with this art that the drawoff pipe 20, which comprises a standpipe, is provided with taps 22 through which a slow current of gas may be introduced to increase the fluidity of the downflowing iron powder, thus preventing bridging and plugging. The iron discharges into a current of hydrogen-containing gas which enters the system through line 25, becomes suspended therein and then discharges into a second vessel 30 of substantially the same size and shape as oxidizer 1 but being disposed somewhat below the latter so as to permit a natural flow of oxidized iron from the oxidizer 1 to the reducer 30. As in the case of the oxidizer, reducing vessel 30 is provided with a reticulated member $G_1$, and furthermore by controlling the upward velocity of the gas in reducer 1 the iron forms a dense suspension in the gas, which dense suspension has an upper level at $L_1$ above which there is a dilute suspension phase. The hydrogen gas causes at least a part of the iron oxide to be reduced to a metallic state, and in this vessel the temperature is controlled within the limits of from about 600 to 900° F. under pressure of from 0 to 300 lbs. per sq. in. It should be pointed out also that the superficial gas velocity in reducer 30 is of the same order as that in oxidizer 1 and that the density of the suspension from $G_1$ to $L_1$ in reducer 30 is approximately the same as the corresponding density in oxidizer 1. The spent gas passes through a plurality of cyclone separators disposed in the upper portion of 30 wherein entrained powder is removed and the gas exits from the vessel through line 35 and if necessary or desirable it may be forced through one or more electrical or magnetic precipitators 36 for the purpose of separating the last traces of entrained powder, which is returned to the vessel 30, while the spent gas is vented from the system through line 40. The reduced iron is withdrawn from the vessel 30 through draw-off pipe 42, provided as usual with taps 44 through which the fluidizing gas may be introduced, and is passed to storage under an inert atmosphere to prevent oxidation of the reduced catalyst or alternatively it is passed directly to the reactor in which the synthesis is to be effected.

The principle of this invention can also be carried out by using a single reaction vessel for the oxidation and reduction of the iron. In this case, the treatment of the iron is conducted batchwise. For example a single batch of iron powder is placed in vessel 1 and subjected to air oxidation until the iron has attained the desired oxygen content. Then the air is displaced by an inert gas, such as flue gas, which in turn is displaced by hydrogen. It is within the contemplation of my invention that the vessel 1 be used in sequence as an oxidizer, a reducer and a vessel in which the actual hydrocarbon synthesis takes place. That is, after the reduction is completed by means of hydrogen-containing gas a stream of carbon monoxide properly proportioned with respect to the hydrogen may be forced into the reactor 1, in which event when maintaining the reactor 1 at synthesis temperatures and pressures, of course, a product would be recovered overhead via line 13.

In the design shown in the drawing, from standpipe 42, the catalyst is discharged into a hydrocarbon synthesis reactor 50 similar in construction and operation to the oxidizer 1 or the reducer 30; that is to say, a dense fluid mass of the catalyst is maintained in the reactor having an upper level at $L_2$ and hydrogen from line 25a plus carbon monoxide from line 49 may be mixed in line 49a, then mixed with catalyst from the bottom of standpipe 42 to form a suspension which is discharged into reactor 50 and passes upwardly into the same reactor through grid $G_2$. In the reactor the proper conditions of temperature (by suitable cooling means, say by means similar to those in oxidizer 1) and pressure are maintained to cause the desired conversion of hydrogen and carbon monoxide to hydrocarbons, and oxygenated hydrocarbons, whereupon the product is withdrawn overhead through line 52 and subjected to the usual distillation and purification to recover gasoline hydrocarbons, alcohols, ketones, and the like in equipment not shown.

In order to explain our invention further, we set forth below specific examples which serve to illustrate our invention without, however, imposing any limitations thereon, for it will be obvious to those skilled in this art that numerous modifications of these particular embodiments of our invention may be made without departing from the spirit of the invention.

Example 1

A catalyst consisting of powdered iron treated with 0.5% $Na_2CO_3$ was partially oxidized in fluidized condition at 700° F. to an oxygen content of 4.5%. The partially oxidized material was compressed into pellets and divided into two portions. One portion (a) was reduced with hydrogen at atmospheric pressure at 1100° F. and the other portion (b) was reduced at 700° F. In an activity test of the two catalysts at 600° F., 250 pounds per square inch pressure using a feed gas containing equal volumes of hydrogen and carbon monoxide and a feed rate of 200 volumes of gas per volume of catalyst per hour, it was found that catalyst (b), reduced at 700° F., gave 3 times the volume of hydrocarbons as catalyst (a) reduced at 1100° F.

Example 2

Commercial powdered iron which had been impregnated with 0.5% $Na_2CO_3$ and dried was oxidized in a fluidized condition by contacting with an oxygen-containing gas for 2 hours at 680-700° F. at atmospheric pressure, followed by treatment for 2 hrs. at 50 pounds gauge pressure and at the same temperature. The catalyst was then reduced in a fluidized condition in the same equipment by treating with hydrogen for 8 hours at 683° F. and atmospheric pressure. It was next contacted in the same unit with a feed gas consisting of a mixture of equal volumes of hydrogen and carbon monoxide at 300 pounds pressure, 552° F. and a space velocity of 222 v./v./hr. of fresh feed plus recycled product gas equal to a total v./v./hr. of 3000. A yield of 141 cc. of $C_4$ and heavier hydrocarbons per cubic meter of hydrogen and carbon monoxide in the feed gas was obtained. The total liquid product obtained in the hydrocarbon layer had an oxygen content of 9.7% showing a large production of oxygenated organic compounds.

To review briefly, our present invention relates to methods for preparing active metallic catalysts, in particular iron, which are adapted to promote the synthesis of hydrocarbons from a mixture of carbon monoxide and hydrogen. We have discovered that active catalysts may be prepared by oxidizing metallic iron in powdered form with air, or oxygen, at relatively low temperatures, but in particular under controllable conditions of temperature by employing the fluid solids technique, as hereinbefore described, an attainment which is not possible where the iron is oxidized in the form of stationary beds. In the oxidation of iron, there is a tremendous quantity of heat released and, as stated, in a large fixed bed or mass of iron it is wholly impossible to maintain uniformity of temperature throughout the mass. We have found that by employing the fluid technique we may control temperature at the low level stated above and maintain the temperature in the oxidation zone substantially uniform throughout. But probably the greatest advantage of our new catalyst prepared as described in detail hereinbefore is that when it is used in the synthesis of hydrocarbons from carbon monoxide, it is adapted to promote the formation of relatively large quantities of oxygenated hydrocarbons, such as alcohols and ketones, products which are of course much more valuable than gasoline hydrocarbons and the like.

Numerous modifications of our invention may be made by those who are familiar with this art.

What we claim is:

1. A method for producing hydrocarbons by a catalytic synthesis from carbon monoxide and hydrogen in the presence of an iron catalyst adapted to promote the formation of substantial quantities of oxygenated hydrocarbons which comprises contacting a mixture of carbon monoxide and hydrogen in a reaction zone at synthesis temperatures and pressure with a catalyst prepared by oxidizing powdered iron at a temperature within the range of from 600°–900° F., thereafter reducing the oxidized iron with a hydrogen-containing gas at temperatures within the range of about 600°–900° F., permitting the carbon monoxide and hydrogen to contact the said reduced iron oxide for a sufficient period of time in the reaction zone to effect the desired conversion, and thereafter recovering from said reaction zone a product containing normally liquid hydrocarbons and oxygenated hydrocarbons.

2. The method set forth in claim 1 in which the reduced iron oxide contains a relatively small amount of alkali metal compound adapted to promote the hydrocarbon synthesis reaction.

3. The method set forth in claim 1 in which the powdered iron is in the form of a fluidized mass in the reaction zone.

ALEXIS VOORHIES, JR.
JOHN J. OWEN.

REFERENCES CITED

The following references are of record in the file of this patent:

UNITED STATES PATENTS

| Number | Name | Date |
|---|---|---|
| 1,093,377 | Boberg | Apr. 14, 1914 |
| 1,695,447 | Woodruff et al. | Dec. 18, 1928 |
| 1,729,697 | Apold et al. | Oct. 1, 1929 |
| 1,984,380 | Odell | Dec. 18, 1934 |
| 2,112,643 | Baensch et al. | Mar. 29, 1938 |
| 2,248,099 | Linckh | July 8, 1941 |
| 2,273,864 | Houdry | Feb. 24, 1942 |
| 2,276,693 | Heath | Mar. 17, 1942 |
| 2,287,891 | Linckh | June 30, 1942 |
| 2,347,682 | Gunness | May 2, 1944 |
| 2,360,787 | Murphree | Oct. 17, 1944 |
| 2,371,619 | Hartley | Mar. 20, 1945 |
| 2,399,984 | Caldwell | May 7, 1946 |
| 2,417,164 | Huber, Jr. | Mar. 11, 1947 |

OTHER REFERENCES

Kahlbach, Fluidization, Chem. & Met. Eng., June 1944, pages 94-98.